United States Patent [19]
Knitter

[11] 3,737,641
[45] June 5, 1973

[54] HYPOTENUSAL SQUARE-ROOTING FOR C.R.T. DISPLAY CORRECTIONS AND THE LIKE

[75] Inventor: James B. Knitter, Westwood, Mass.

[73] Assignee: Intronics Incorporated, Newton, Mass.

[22] Filed: Feb. 4, 1971

[21] Appl. No.: 112,662

[52] U.S. Cl............235/197, 235/193.5, 315/276 DC
[51] Int. Cl...............................................G06f 15/34
[58] Field of Search...............315/24, 27 TD, 27 GD, 315/27 R; 235/197, 198

[56] References Cited

UNITED STATES PATENTS

| | | | |
|---|---|---|---|
| 3,501,669 | 3/1970 | Henderson | 315/24 |
| 3,422,305 | 1/1969 | Infante | 315/31 R |
| 3,517,252 | 6/1970 | Williams | 315/24 |
| 3,308,334 | 3/1967 | Bryson | 315/276 D |
| 3,422,306 | 1/1969 | Gray | 315/276 D |

Primary Examiner—Benjamin R. Padgett
Assistant Examiner—J. M. Potenza
Attorney—James E. Mrose and Mary C. Thomson

[57] ABSTRACT

Electronic corrections for pincushion-type distortions, promoting large and precise displays by short-length flat-faced large-area cathode ray tubes, are automatically produced at high speeds by miniature solid-state circuitry which introduces hypotenusal compensatory modifications into beam-deflection signals over wide deflection angles, the necessary square-rooting actions being those which take minimum electron-beam length into account and being developed by way of cooperating semiconductor devices whose characteristics and interactions force certain combined circuit currents to bear essentially square-root relationships to sums of squares of reference currents.

22 Claims, 9 Drawing Figures

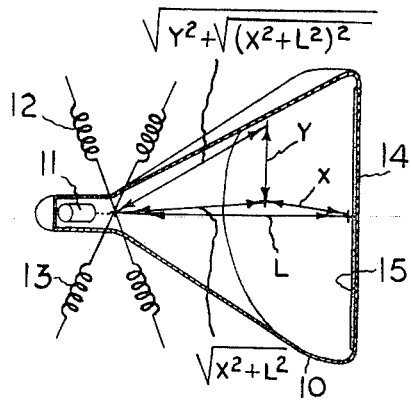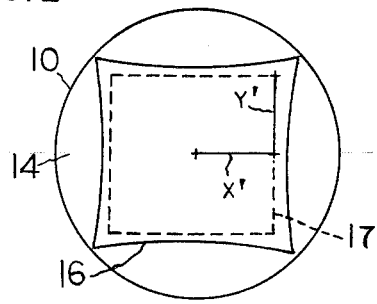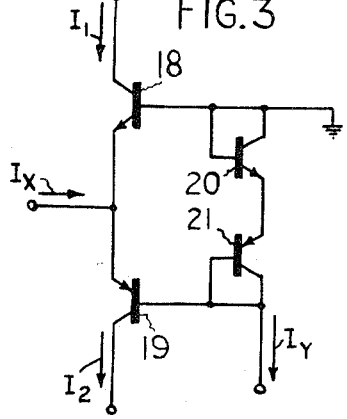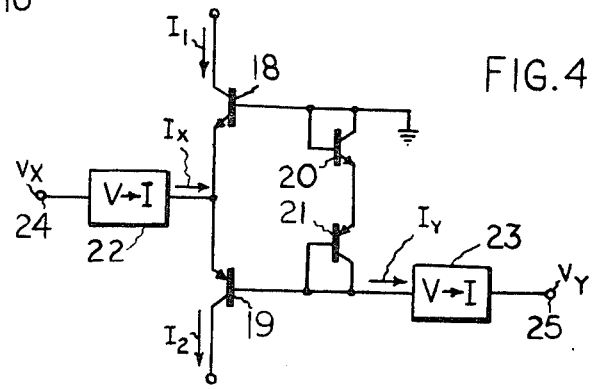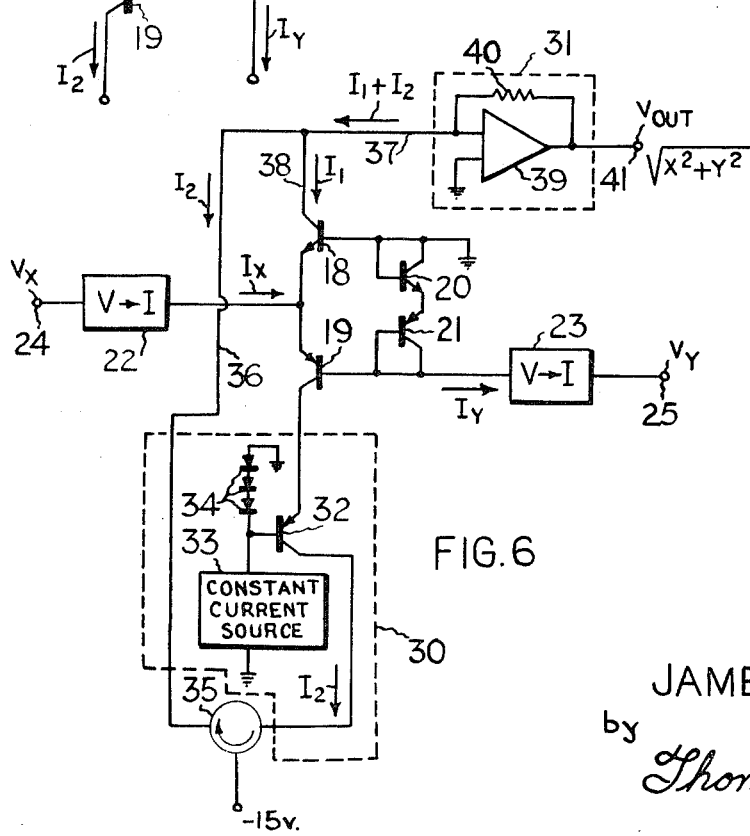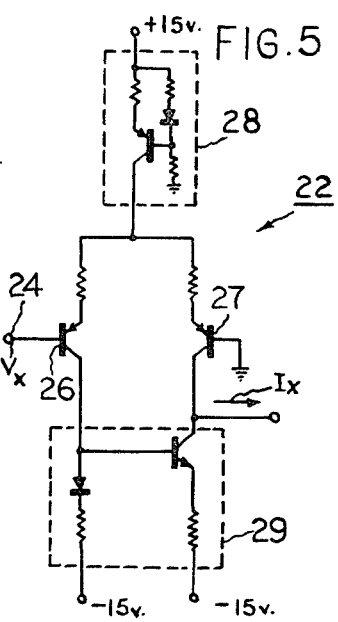
INVENTOR:
JAMES B. KNITTER
ATTORNEYS

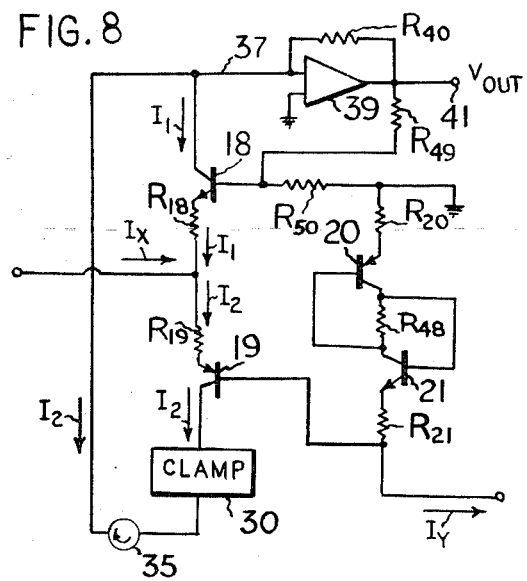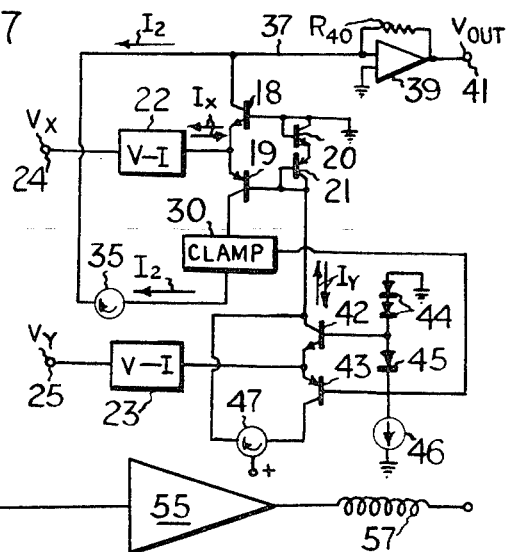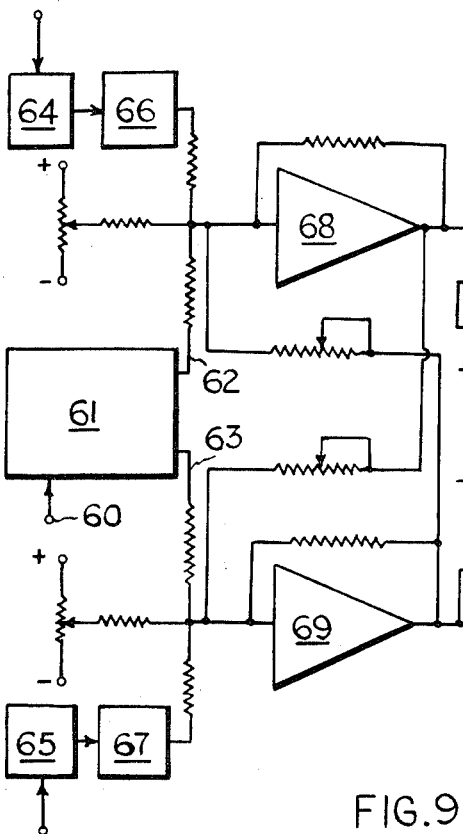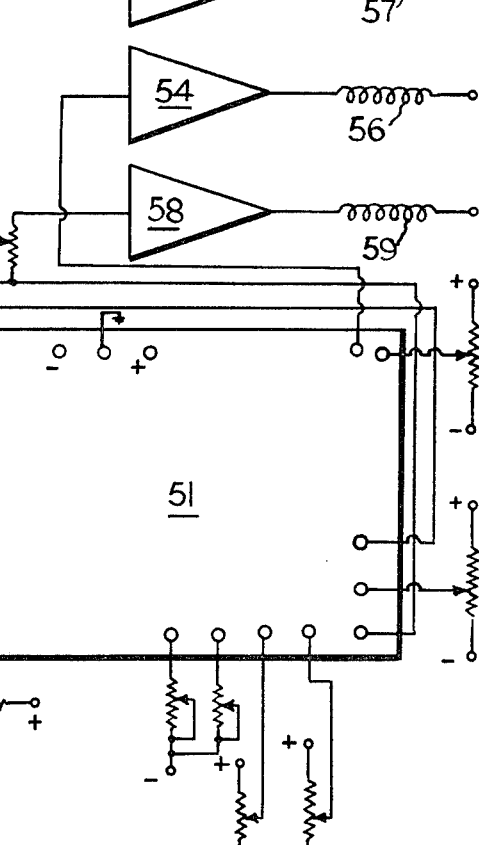

HYPOTENUSAL SQUARE-ROOTING FOR C.R.T. DISPLAY CORRECTIONS AND THE LIKE

BACKGROUND OF THE INVENTION

The present invention relates to improvements in electronic circuitry for developing output signals related to the square root of the sum of squares of excitation signals, and in one particular aspect, to novel and improved high-precision miniature solid-state networks of relatively low-cost and uncomplicated construction which are especially well suited to wide-bandwidth corrections of distortions in cathode ray tube displays, notably correction of large-signal pincushion distortions in flat and semi-flat magnetically-deflected displays.

It is well known that optimum cathode ray tube designs for many purposes should involve short tube lengths, large-area flat screens, and wide angles of electron-beam deflections. By way of example of the important uses which call for perfection of flat-faced precision displays are: computer graphics; document reproduction; air traffic control radar; and photo typesetting. However, because of practical obstacles to precision displays by such tubes, their screens are commonly fashioned with a speherical contour, the same being true of associated shadow masks in the case of color displays, and, where flat screens are employed to offset errors such as those of parallax created by curved screens, deflection angles and the resulting dimensions of reproduced images must be kept very small to minimize inherent distortions. A truly critical intrinsic distortion problem is that associated with so-called "pincushion" effects, resulting from the fact that, with increasing horizontal and vertical deflection forces experienced by electrons in a C.R.T. beam, the drift paths to ultimate impingements upon phosphor of a flat screen are increasingly long and, as a consequence of the longer drifts, the electrons will deflect horizontally and vertically more than intended by the deflection forces developed back at the site of the deflection yoke. Efforts have been made to compensate by way of injecting electrical correction signals for each further increment of horizontal and vertical deflection signals, but this technique necessarily entails discontinuities which restrict precision, and, further, the related electronic-network implementation of this approach is of great complexity and expense. And, where mathematical approximation has been relied upon as a prior basis for developing continuous correction signals, the approximation has not proved to be a valid and successful solution to the difficulties encountered with very wide angles of deflection, such as deflections above 80°. In addition to the aforesaid pincushion distortions, there are serious problems associated with maintenance of the exceedingly sharp beam focus which is imperative in high-precision displays, because as the beam is deflected over wide angles, the path lengths to impingements upon a flat screen vary and do not correspond to that fixed minimum focal length which produces a specific minute spot size at the center of the screen. Improved corrections for pincushion distortions, in accordance with the present teachings, are continuously introduced by relatively uncomplicated highly stable analog circuitry which uniquely takes into account the minimum tube length from center of the deflection to the screen, together with both instantaneous rectangular-coordinate deflection signals, and which develops modified deflection signals based upon a key recognition that the appropriate corrected signals are respectively proportional to horizontal and vertical deflection parameters each divided by the square root of the sums of the squares of both of these same parameters and the square of a minimum-tube-length parameter. Further, the recognitions and innovations extend to related fast wideband networks for implementing the precise electronic representation of the square root by way of relatively non-critical solid-state circuit components.

SUMMARY

The present invention is aimed at creating improved, high-precision, practical and reliable, analog electronic circuitry which produces output signals related to the square roots of the sums of squares of input signals and which operates efficiently both at high speeds and with large variations in signals. A preferred embodiment of such circuitry requires only solid-state semiconductor and resistance elements, without involving inductance or capacitance; moreover, the resistances need not be of very close tolerance and the semiconductors are relatively non-critical as to matching. Interactions which are of key importance are caused to occur by way of a four-terminal four-transistor network comprising two pairs of series-connected transistors, each typically involving emitter-connected NPN and PNP transistors, the bases of one series-connected pair being connected across the other series-connected pair, and each transistor of the latter pair having its collector and base connected in common. Preferably, the base-emitter voltage drop characteristics of all the transistors in the network are about the same, assuring a good approximate matching of reverse saturation current characteristics, and the transistors have relatively low emitter resistance. Uniquely taking advantage of intrinsic logarithmic non-linear characteristics of the transistors, and, specifically that base-emitter voltages are closely related to the natural log of the ratio of collector current to reverse saturation current, the network is forced to respond to two input signals, in current-related form, carried by way of two of its terminals, and the remaining two terminals are then forced to yield currents, through external paths, the sum of which is related to the square root of the sum of squares of the inputs as desired. For purposes of operation with input signals whose voltages represent the data of interest, voltage-to-current converters may be used to make the needed translations, and, on the output side, an output voltage related to the summed output currents, and, hence to the square root of the sum of squares of the input signals, is conveniently derived from these currents by an operational amplifier functioning as a servo. Having achieved a first square-rooting of a pair of input signals in the foregoing manner, the output may then be processed similarly with a third input signal, to derive a "hypotenusal" square-rooting in which the ultimate output is instantaneously related to the square root of the sum of the squares of the three input signals. Where two of the signals represent horizontal and vertical deflection signals to be applied to a short flat-faced cathode ray tube, the third may be a constant representing the minimum electron-beam length, and the output then comprises a correction signal which serves to compensate for geometry-induced distortions, such as so-called "pincushion" distortions and dynamic focus aberrations.

It is one of the objects of the present invention to provide novel and improved electronic circuitry which achieves square-rooting accurately related to the sums of squares of signals, and which is of low-cost manufacture involving relatively non-critical components capable of functioning at high speeds such as are requisite to uses in correction of distortions in cathode ray tube displays.

Another object is to provide a unique solid-state wideband hypotenusal square-rooting network of relatively uncomplicated form lending itself to miniaturized integrated-circuit embodiments and capable of reliable high precision operation.

A further object is to provide novel analog high-speed electronic sum-of-squares square-rooting circuitry wherein semiconductor devices smoothly control the delivery of characterizing output signals, without breakpoints.

Still further, it is an object of provide electrical networks in which the characteristics of a plurality of transistors distinctively force output currents to assume a relation to input signals which is a precise and continuous synthesis of the square root of the sum of squares of input signals.

In addition, it is an object to improve cathode ray tube displays by eliminating geometry-induced distortions inherent in short wide-angle flat tubes via precision corrections synthesized continuously and at appropriately high speeds from reference deflection signals and a tube-length parameter, the corrections being forced to assume a critical relationship to the square root of sums of squares of the references by way of automatic control of current distributions in a current-responsive network.

BRIEF DESCRIPTION OF THE DRAWINGS

Although the features of this invention which are considered to be novel are set forth in the appended claims, further details as to preferred practices and as to further objects and advantages of the invention may be most readily comprehended through reference to the following description taken in connection with the accompanying drawings, wherein:

FIG. 1 is a partly schematic and partly cut-away pictorial illustration of a flat-screen cathode-ray display tube, together with a graphical representation of deflection dimensions;

FIG. 2 presents a front view of the screen of the display tube of FIG. 1, together with traces characterizing pincushion distortion;

FIG. 3 is a schematic diagram of a transistor network which promotes the production of output currents representative of the square root of the sum of squares of input currents;

FIG. 4 illustrates the network of FIG. 3 in association with auxiliary voltage-to-current converters which adapt the network for responses to voltage signal inputs;

FIG. 5 represents the circuitry of a voltage-to-current converter which may typically be used in the circuitry of FIG. 4;

FIG. 6 provides a circuit diagram of a sum-of-squares square-rooting system involving electronic servo and clamping circuits assuring development of the desired square-root outputs;

FIG. 7 illustrates a modification of the system of FIG. 6 which allows both input signals to be of either polarity;

FIG. 8 is a system diagram generally like that of FIG. 6 in which correction is made of third-order effects, notably emitter resistances; and FIG. 9 represents in block-and-schematic form a typical application of the correction circuitry of this invention, in a precision digital input cathode ray tube display system.

DESCRIPTION OF THE PREFERRED EMBODIMENTS

As an aid to understanding of some of the difficulties which are resolved through practice of this invention, the protrayals in FIGS. 1 and 2 characterize certain deflection problems encountered in cathode ray tubes. In FIG. 1, the neck of tube 10 is shown in association with an electron gun structure 11 and horizontal and vertical electromagnetic deflection yoke coils 12 and 13, and its substantially flat screen 14 carries a suitable phosphor coating 15. The minimum distance or length of an electron beam from its center of yoke deflection to the center of the flat screen or face 14, is signified by the dimension $L$, and any horizontal deflection, $x$, for example, necessarily entails the increased beam length equal to $\sqrt{x^2 + L^2}$. When a further deflection, $y$, occurs in the vertical direction, the beam length increases correspondingly, to $\sqrt{x^2 + y^2 + L^2}$. Actual beam length at any instant may thus be calculated as the square root of the sums of squares of a minimum beam-length parameter, $L$, and of horizontal and vertical deflection factors $x$ and $y$. Because electron speeds are unchanged by deflection, variable beam lengths necessarily involve variable transit times for the electrons before their impingements upon the screen phosphor, and, minute as these times are, they are responsible for serious collateral non-linearities in the actual deflections which occur, because the lateral deflection velocities are created by and at the yoke and are linearly related to the current in the yoke windings, and, thereafter, the actual total deflections are determined by the product of the lateral velocities and lengths of time the electrons remain in transit. It is for such reasons that the trace 16 of what should be substantially a square appears instead as an enlarged distorted pin-cushion-like trace, in FIG. 2, whereas the intended $x'$ and $y'$ deflections should have resulted in a trace like that characterized by dashed linework 17. Dynamic focus distortions, like so-called "pincushion" distortions, are affected by like considerations, and the related difficulties are more pronounced as the tube lengths become shorter and the deflection angles are increased. Spherical contouring of the tube face, and associated non-uniform phosphor-dot patterns and shadow-mask apertures in the case of color display tubes tend to affect such difficulties somewhat, but at the expense of manufacturing complications. Moreover, precision CRT displays, involving minute spot sizes, are not accurately characterized for many purposes on spherically-contoured screens, and the problems which have been alluded to here have been resolved only in part through restriction of deflections to only a small central region in relatively long flat-faced tubes. Typical of the needs for exceedingly accurate broad-area displays on short flat-faced CRT's are: air-traffic control radar displays, computer graphics, document transmission and reproduction, and phototypesetting. Bandwidth requirements for electronically-induced corrections of the distortions on a continuous basics are severe, and there has been no known simple analog circuitry for achieving such corrections.

The aforesaid recognitions having to do with relation of distortion errors to the square root of sums of squares of deflection factors are of special significance in implementation of the practice invention, inasmuch as it becomes possible to modify the deflection and/or dynamic focus signals to take such errors into account in straightforward fashion once that relation is expressed in electrical-signal form. In that connection, a key network for deriving the relation is presented in FIG. 3, wherein there are four semiconductor devices, 18–21, in a predetermined circuit relationship which responds to the currents in two input paths by yielding two output-path currents whose sum represents the square root of the sum of squares of currents in the input paths. The illustrated devices 18 and 20 are N-P-N transistors, and both of the transistor pairs 18–19 and 20–21 have their emitters connected in series. Collectors of the first transistor pair, 18–19, are intended to carry the aforesaid two output-path currents, $I_1$ and $I_2$, respectively, and the collectors of the second pair, 20–21, are connected in common with their respective bases and with the respective bases of the first pair of transistors. With one end of the series-connected pair 20–21 grounded and the other forced to conduct one of the input currents, $I_y$, related to a factor $y$, and with the series-connected emitters of the first pair, 18–19, connected to respond to the other input current, $I_x$, related to a factor $x$, the sum of output-path currents $I_1$ and $I_2$ can be shown to be accurately representative of the square root of $x^2$ and $y^2$. That this occurs is explained by considering the base-emitter voltage ($V_{be}$) characteristics and relationships in the four-transistor network. For transistors with very large current gain connected as shown, the sum of base-emitter voltages for the series-connected pair 18–19 [$V_{be(18)} + V_{be(19)}$] must be the same as the sum of base-emitter voltages for the paralled series-connected pair 20–21 [$V_{be(20)} + V_{be(21)}$]:
and, because it is recognized that the $V_{be}$ of each of the transistors can be taken as $KT/q \ln I_c/I_o$, substitution yields:

$$KT_{(18)}/q \ln I_1/I_{o(18)} + KT_{(19)}/q \ln I_2 I_{o(19)} = KT_{(20)}/q \ln I_y/I_{o(20)} + KT_{(21)}/q \ln I_y/I_{o(21)}$$

Where: $K$ = Boltzmann's constant,
$T$ = Temperature (subscripts in parentheses designating the transistors),
$I_o$ = common base current gain X emitter junction reverse saturation current (subscripts in parentheses designating the transistors), and
$q$ = electron charge.

With temperatures of all junctions being substantially the same, as they are in practical integrated-circuitry embodiments of the network where the junctions are close together, the equation simplifies to:

$$1n \, I_1/I_{o(18)} + 1n \, I_2/I_{o(19)} = 1n \, I_y/I_{o(20)} + 1n \, I_y/I_{o(21)}$$

and, because the logarithms translate as multiplication:

$$I_1 I_2/I_o(18)I_o(19) = I_y^2/I_o$$

Reverse current saturations ($I_{o(18)}$, $I_{o(19)}$, $I_{o(20)}$ and $I_{o(21)}$) are readily matched, as by driving a reference current through transistors and selecting those which have about the same voltage from base to emitter, $V_{be}$, whereupon the equation reduces to:

$$I_1 I_2 = I_y^2$$

It is also known that the collector currents for the first pair of transistors, 18–19, are related as follows:

$$I_1 + I_x = I_2$$

such that, with $I_1 = I_y^2/I_2$ and $I_2 = I_y^2/I_1$ each being substituted in the equation $I_1 = I_y^2$, $I_2$ and $I_1$ are defined as:

$$I_2 = I_x + \sqrt{I_x^2 + 4I_y^2}/2$$
$$I_1 = -I_x + \sqrt{I_x^2 + 4I_y^2}/2$$

and their sum is in the desired square-root relationship to the sum of squares of $I_x$ and $I_y$:

$$I_1 + I_2 = \sqrt{I_x^2 + 4I_y^2}.$$

In the foregoing, the relationship $V_{be} = KT/q \ln I_c/I_o$ for the transistors is of course an important factor, and related recognitions are based upon the expression for collector current, $I_c$, as follows (Ebers-Moll equation):

$$I_c = \alpha_n I_{eo} (e^{q V_{be}/KT} - 1) + \alpha_i I_{co} (e^{q V_{cb}/KT} - 1) + \ldots$$

in which:
$\alpha_n$ = common base current gain of the transistor $\cong 1$
$I_{eo}$ = emitter junction reverse saturation current
$e$ = 2.718281828
$q$ = electron charge (1.602 × 10$^{-19}$ coulombs)
$V_{be}$ = voltage from base to emitter
$K$ = Boltzmann's constant, 1.38 × 10$^{-23}$ watt sec/°K
$T$ = temperture (°K)
$\alpha_i$ = inverted common base current gain $\approx 1$
$I_{eo}$ = collector junction reverse saturation current
$V_{cb}$ = voltage, collector to base If $V_{cb}$ is zero, the second term drops out, leaving:

$$I_c = \alpha_n I_{eo} (e^{q V_{be}/KT} - 1)$$ Letting $\alpha_n I_{eo}$ be represented by $I_o$, then:

$$I_c = I_o (e^{q V_{be}/KT} - 1)$$

For the assumed condition where $q V_{be}/KT >> 1$,
$I_c = I_o e^{q V_{be}/KT}$, and $V_{be}$ then equals $KT/g \ln I_c/I_o$, as indicated earlier herein.

Where pincushion distortions are to be corrected, for example, the current $I_{(12)}$ in the horizontal deflection coil should be corrected in relation to the horizontal deflection signal, $x$, such that it will be:

$$I_{(12)} = k \, [x/\sqrt{^2 + (\sqrt{y^2 + L^2}2}\,]$$ and the current $I_{(13)}$ in the vertical deflection coil should be corrected in relation to the horizontal deflection signal, such that it will be:

$$I_{(13)} = k \, [u/\sqrt{y^2 + (\sqrt{x^2 + L^2})^2}]$$

where $k$ is an appropriate constant and L the aforesaid minimum beam length. A network such as that of FIG. 3 accomplishes square-rooting of the sum of two squared terms, at high speed, and the above-noted desired corrections involving three terms may be developed by square-rooting twice, using one such network for two of the terms and then a second similar network for the third term and the square root of the sum of squares for the first two terms.

FIG. 4 illustrates the same network as that of FIG. 3, together with associated voltage-to-current converters (V-I) 22 and 23 which respectively determine the currents $I_x$ and $I_y$ in response to the input voltages $V_x$ and $V_y$. The latter voltages applied at terminals 24 and 25 of the network, may typically be the horizontal and vertical deflection signals intended for a CRT display tube, and from which pincushion correction signals are to be derived by way of electronic square-rooting. Details of one suitable embodiment for these converters appear in FIG. 5, which is an example of the circuitry for converter 22. There, a differential pair of transistors 26 and 27 is supplied by way of a constant-current source circuit 28, and the collector paths of the transistors are coupled to a current-recirculation circuit 29, in a known manner. Differences between the input voltage, $V_x$, applied at the base of transistor 26 and a reference voltage level maintained at the base of transistor 27, shown grounded, yield related differences in collector currents, and, in turn, establish the desired output current, $I_x$. A similar converter serves to provide a suitable current input, $I_y$, in response to the deflection-voltage signal $V_y$. In other applications of the square-rooting network, such converters may not be necessary if current inputs are available directly, and/or the conversions to current may be made responsive to factors other than voltage, such as force or light intensity.

In FIG. 6, the network and converter combination of FIG. 4 is further associated with two auxiliary circuits, one of which, 30, keeps the collector-to-base voltage, $V_{cb}$, of transistor 19 equal to zero, a condition which was referred to hereinabove in the analysis of network function. The second auxiliary circuit, 31, which is in the nature of a servo, keeps the collector-to-base voltage, $V_{cb}$, of transistor 18 equal to zero, and thereby satisfies the same required condition for the latter transistor also. The clamping circuit 30 fulfills not only the function of holding the collector of transistor 19 at a fixed voltage but, in addition, provides a needed current path for the collector-path current $I_2$. For these purposes, a transistor 32 with its emitter-collector path in series with the collector of transistor 19 has its base in series with a constant-current source 33, which may be like circuit 28 of FIG. 5, the source 33 being parallelled with a series of three diodes 34 which serve a temperature-compensation or tracking function in relation to the opposed transistor "diode" drops. Further, the current recirculator 35, which may be like circuit 29 of FIG. 5, assures that current $I_2$ is of the correct direction in a branch connection 36 with a supply lead 37 from which current $I_1$ is also drawn through a branch 38 to the collector of transistor 18. Servo circuit 31, involving an operational amplifier 39 and associated feedback resistance $R_{40}$, develops an output voltage at terminal 41 which is in the intended accurate relationship to the sum of $I_1$ and $I_2$, and, therefore, to the square root of the sum of the squares of the system input voltages $V_x$ and $V_y$, the latter voltages in turn characterizing the factors $x$ and $y$, respectively. The functions of auxiliary clamping circuitry 30 may be established in ways other than that specifically illustrated. By way of example, a reference voltage source combined with a circuit providing a path for current $I_2$ will have the intended effects; this may take the form of an operational amplifier supplying voltage to the base of transistor 32 in FIG. 6, with the two-inputs to the operational amplifier being taken from connections with the base and collector of transistor 19.

The input signal $V_x$ in FIG. 6 may be either positive or negative, although the circuitry operates properly only when the current $I_y$ is in the illustrated direction. However, $V_y$ may be allowed to be either positive or negative when the circuitry is modified as shown in FIG. 7. There, the network will be seen to be generally as depicted and described in relation to FIG. 6, except that a cascode arrangement is employed, with the input from the $V_y$ converter 23 being to the series-connected emitters of a pair of transistors 42 and 43, much as in the case of the input from the $V_x$ converter 22. The base of transistor 42 has its voltage level set by diodes 44, and a further diode, 45, across the bases of transistors 42 and 43, serves to reduce the voltage needed to turn these transistors on, thereby increasing speed of operation; all of these diodes are in series with a constant-current source 46 and the series-connected diodes are in turn connected to clamp 30. A current recirculator 47, which may be like circuits 29 and 35, couples the collectors of transistors 42 and 43, and their collector circuits are joined with the common base emitter of transistor 21 in the same manner as was converter 23 in FIG. 6. Both input signals $V_x$ and $V_y$ may then have either positive or negative excursions, with the output at terminal 41 characterizing the square root of the sums of their squares.

Operation of each of the four transistors 18–21 in the square-rooting network is found to be affected somewhat by certain parasitic resistances the effects of which are represented by resistances $R_{18}$, $R_{19}$, $R_{20}$ and $R_{21}$ in series with the emitters of transistors of number corresponding to these subscripts, in FIG. 8. It is understood that the effects of these resistances are developed partially by resistances in the emitters and partially in the bases of the transistors. One of their unwanted effects is that, because current $I_y$ flows in and develops voltages across $R_{20}$ and $R_{21}$, the voltages appearing at the bases of transistors 18 and 19 are correspondingly spread apart and may be so spread as to detract from the desired logarthmic relationship set forth hereinabove. However, the preferred optimum conditions are restored by changing the connections of transistors 20 and 21 from those described earlier herein, and by inserting a compensating resistance $R_{48}$ between them. Specifically, this is shown in FIG. 8 as involving use of a P-N-P transistor for transistor 20, its emitter being coupled with the base of transistor 18 and its base being connected with its collector via the compensating resistance $R_{48}$, and as involving use of an N-P-N transistor for transistor 21, its emitter being coupled with the base of transistor 19 and its base being connected with its collector via the same compensating resistance $R_{48}$ albeit in the opposite direction. This results in the collectors of the two transistors 20 and 21 being connected in series through resistance $R_{48}$, and, more significantly for compensation purposes, the voltage drop across $R_{48}$ due to flow of current $I_y$ through it substracts from the voltage drops across $R_{20}$ and $R_{21}$. Reistance $R_{48}$ is selected to be about the same as the sum of $R_{20}$ and $R_{21}$, such that these voltage drops are in offsetting relation, to effect one of the desired compensations. Therefore, insofar as the unwanted influences of the parasitic resistances and current $I_y$ are concerned, the resistance and voltage-drop effects are eliminated, leaving unimpaired the intended logarithmic influences of the junctions of transistors 20 and 21 in he network. There are also kindred problems arising out of the resistances $R_{18}$ and $R_{19}$, and these are treated separately because currents $I_1$ and $I_2$ are not necessarily equal, nor equal to current $I_y$. In relation to these effects, the desired compensation voltage is equal to $I_1R_{18} + I_2R_{19}$, and, because $R_{18}$ and $R_{19}$ are made equal by appropriate selection of transistors 18 and 19, the compensation voltage equals $R_{18}(I_1 + I_2)$. Conveniently, the output voltage at terminal 41 is proportional to $I_1 + I_2$, and may simply be divided by way of a pair of resistances $R_{49}$ and $R_{50}$ to yield a compensating voltage, across $R_{50}$, equal to the aforesaid voltage $R_{18}(I_2 + I_2)$. The prescribed compensation is realized when $R_{49}R_{50}/R_{49}+R_{50}$ is made equal to resistance $R_{18}$, which is the same as $R_{19}$. In the arrangement shown, the compensation voltage appears between base of transistor 18 and the network ground, although this is not a limiting feature.

The diagram appearing in FIG. 9 typifies an application of the hypotenusal square-rooting circuitry for correction of the inputs in a precision digital input display system. There, the various square-rooting networks which are needed are incorporated into compact module 51 in which the semi-conductor junctions are advantageously proximate and are physically caused to be preserved at about the same temperature, there being no tendency for any of the semiconductors to develop localized hot spots in circuitry of the type which have been described. SUch a module responds to horizontal input voltage applied via line 52 and to vertical input voltage applied via line 53, and responds by delivering the needed corrected horizontal and vertical deflection signals to horizontal and vertical deflection amplifiers 54 and 55, respectively, for precision excitation of the horizontal and vertical deflection yoke coils 56 and 57, respectively, to eliminate pincushion-type errors from a precision falt-faced display CRT (not shown). The same type of square-rooting is exploited to develop corrected dynamic-focus signals, which are applied to dynamic focus amplified 58 exciting the dynamic focus coil 59. in this illustrative system application, a digital input at terminal 60 controls a character generator 61 wich delivers horizontal and vertical output signals to lines 62 and 63, respectively. Digital inputs are also applied to the horizontal and vertical digital-to-analog circuits 64 and 65, respectively, which are associated with sample hold circuits 66 and 67, respectively. Summing amplifiers 68 and 69 appear in the respective horizontal and vertical deflection-signal channels, providing appropriate excitations for input lines 52 and 53 to the correction module.

It should be understood that the specific embodiemnts and practices described herein have been presented by way of disclosure rather than limitation, and that those skilled in the art will appreciate that various modifications, combinations and substitutions may be effected without departure from the spirit and scope of this invention in its broader aspects and as set forth in the appended claims.

What I claim as new and desire to secure by Letters Patent of the United States is:

1. Circuitry for characterizing the square root of sums of squares of inputs, comprising a plurality of semi-conductor devices, means interconnecting said devices in a network relationship, said network relationship involving current paths through different ones of said devices, means forcing current flow in one of the paths to involve current representing a first input, means forcing current flow in another of the paths to involve current representing a second input, said interconnecting means maintaining the product of currents in said devices in said one of the paths equal to the square of current representing said second input in said other of said paths and maintaining the difference in currents in said devices in said one of the paths equal to the current representing said first input in said one of the paths, whereby the currents in said devices in said one of the paths are related to the square root of the sums of squares of said first and second inputs.

2. Circuitry for characterizing the square root of sums of squares of inputs, comprising a first current path including semiconductor devices, means forcing the current flow through one of said semiconductor devices to involve the sum of current through another of said devices and of current representing a first input, a second current path, means forcing current flow through said second path to involve current representing a second input, and means coupling said paths together into a network relationship wherein the product of currents through said semiconductor devices is substantially equal to the square of said current representing said second input, whereby the currents through said devices are related to the square root of the sums of squares of said first and second inputs.

3. Circuitry for characterizing the square root of sums of squares of inputs as set forth in claim 2 wherein said first current path includes a pair of transistors connected in series, and wherein said second current path includes semiconductor devices, said coupling means including means applying voltages associated with said semiconductor devices in said second current path to control electrodes of said transistors.

4. Circuitry for characterizing the square root of sums of squares of inputs as set forth in claim 3 wherein said transistors comprise NPN and PNP transistors having their emitters interconnected, wherein said current representing said first input is coupled with said first path at the junction of said emitters, and wherein said means applying voltages applies said voltages to the bases of said transistors.

5. Circuitry for characterizing the square root of sums of squares of inputs as set forth in claim 4 wherein said semiconductor devices in said second path comprise a pair of series-connected transistors having their bases connected with their collectors, said voltages being the voltages at ends of the series connection of said series-connected transistors, and wherein said means forcing current through said second path forces current representing said second input through said series-connected transistors.

6. Circuitry for characterizing the square root of sums of squares of inputs as set forth in claim 5 wherein said inputs are in the form of voltages, and wherein each of said means forcing current includes a voltage-to-current converter responsive to different ones of said voltages.

7. Circuitry for characterizing the square root of sums of squares of inputs as set forth in claim 5 wherein said pair of series-connected transistors comprises NPN and PNP transistors having their emitters interconnected and each having its common emitter-and collector connected with a different one of the bases of the transistors in said first current path.

8. Circuitry for characterizing the square root of sums of squares of inputs as set forth in claim 5 wherein said pair of series-connected transistors comprises NPN and PNP transistors each having its emitter connected with a different one of the bases of the transistors in said first current path and each having its base connected with its collector in a different direction through a compensating resistor, said compensating resistor having a resistance substantially equal to the sum of effective emitter resistances of said series-connected transistors.

9. Circuitry for characterizing the square root of sums of squares of inputs as set forth in claim 5 wherein the reverse current saturation characteristics of all of said transistors are substantially the same, whereby the base-to-emitter voltages of all of said transistors are substantially the same for the same current therethrough.

10. Circuitry for characterizing the square root of sums of squares of inputs as set forth in claim 4 further comprising means clamping the voltage of the collector of one of said transistors to a voltage substantially the same as that at its base.

11. Circuitry for characterizing the square root of sums of squares of inputs as set forth in claim 4 further comprising a current recirculator recirculating the collector-circuit current flowing through one of said transistors, and means producing output voltages related to the sum of the collector-circuit currents through said transistors, whereby said output voltages are related to the square root of the sums of squares of said first and second inputs.

12. Circuitry for characterizing the square root of sums of squares of inputs as set forth in claim 11 wherein said means producing output voltages comprises an operational amplifier delivering said collector-circuit currents to said reflector and to the collector circuit of the other of said transistors and producing said output voltages related to the sum of said collector-circuit currents.

13. Circuitry for characterizing the square root of sums of squares of inputs as set forth in claim 8, further comprising means producing output voltage related to the sum of collector-circuit currents through said transistor in said first path, voltage-dividing means dividing out of said output voltages compensation voltages substantially equal to the sum of voltage drops across effective emitter resistances of said transistors in said first path, and means coupling said compensation voltages in series opposition to said voltage drops.

14. Circuitry for characterizing the square root of sums of squares of inputs as set forth in claim 13 wherein the effective emitter resistances of said transistors in said first path are substantially the same, and wherein said compensation voltages are substantially equal to the product of said effective emitter resistance and the sum of said collector-circuit currents through said transistors in said first path.

15. Circuitry for characterizing the square root of sums of squares of inputs as set forth in claim 6 wherein said means forcing current through said second path includes a series-connected pair of auxiliary transistors having their emitters interconnected and their collectors in series with said second path and a voltage source, current recirculator means interconnecting the collector circuits of said auxiliary transistors, means applying predetermined voltages to the bases of said auxiliary transistors, and means applying current from the voltage-to-current converter which is responsive to voltages representing said second input to the interconnected emitters of said auxiliary transistors, whereby said circuitry responds to voltages of either polarity representing said second input.

16. Circuitry for developing electrical output signals for the correction of display distortions resulting from variable lengths of deflected electron beam paths in a cathode ray tube, comprising a first network including first and second current flow paths, a pair of transistors connected in series in said first path, means forcing the current flow through one of said transistors to involve the sum of current through the other of said transistors and a first current representing to at least one of three magnitude factors comprising horizontal deflection signal, vertical deflection signal, and a minimum electron beam length for the cathode ray tube, semiconductor devices in said second path, means forcing current flow through said second path to involve a second current representing at least one other of said three factors, and means coupling said paths together in a network relationship wherein the product of currents through said transistors is substantially equal to the square of said second current, said coupling means including means applying voltages associated with said semiconductor devices in said second path to control electrodes of said transistors, whereby the sum of currents through said transistors is related to the square root of the sums of squares of factors among said three factors.

17. Circuitry for developing electrical output signals for the correction of display distortions resulting from variable lengths of deflected electron beam paths in a cathode ray tube as set forth in claim 16 wherein said transistors in each pair have their emitters interconnected, wherein said first current representing at least one of said factors is coupled with said first path at the junction of said emitters, wherein said semiconductor devices in said secon path comprise a pair of series-connected transistors having their bases connected with their collectors, and wherein said means applying voltages applies voltages at the ends of said series-connected transistors to the bases of the transistors in said first path.

18. Circuitry for developing electrical output signals for the correction of display distortions resulting from variable lengths of deflected electron beam paths in a cathode ray tube as set forth in claim 17 wherein the reverse current saturation characteristics of all of said transistors are substantially the same, and further comprising means clamping the voltage of the collector of said one of said transistors in said first path to a voltage substantially the same as that at its base, a current recirculator recirculating the collector-circuit current flowing through said one of said transistors, and means characterizing the sum of the collector-circuit currents through said transistors in said first path.

19. Circuitry for developing electrical output signals for the correction of display distortions resulting from variable lengths of deflected electron beam paths in a cathode ray tube as set forth in claim 18 wherein said transistors in each of said paths comprise a NPN and PNP transistor, and operational amplifier means producing output voltages related to said sum of the collector-circuit currents.

20. Circuitry for developing electrical output signals for the correction of display distortions resulting from variable lengths of deflected electron beam paths in a cathode ray tube as set forth in claim 17 wherein one of said first and second currents is directly related to one of said three factors and the other of said currents is directly related to one other of said three factors.

21. Circuitry for developing electrical output signals for the correction of display distortions resulting from variable lengths of deflected electron beam paths in a cathode ray tube as set forth in claim 17 wherein one of said first and second currents directly represents one of said three factors and the other of said currents represents square root of the sums of squares of the other two of said three factors.

22. Circuitry for developing electrical output signals for the correction of display distortions resulting from variable lengths of deflected electron beam paths in a cathode ray tube as set forth in claim 21 comprising a second network the same as said first network and developing the said other of said currents.

\* \* \* \* \*